Figure 1:
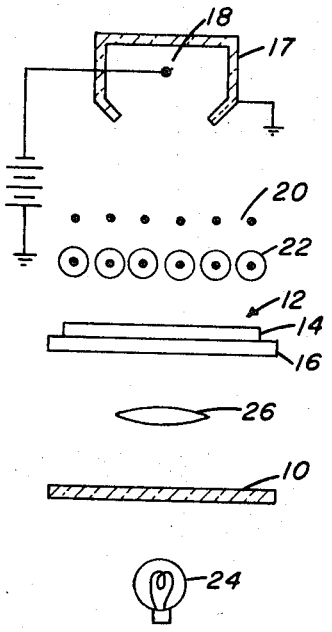
Figure 2:
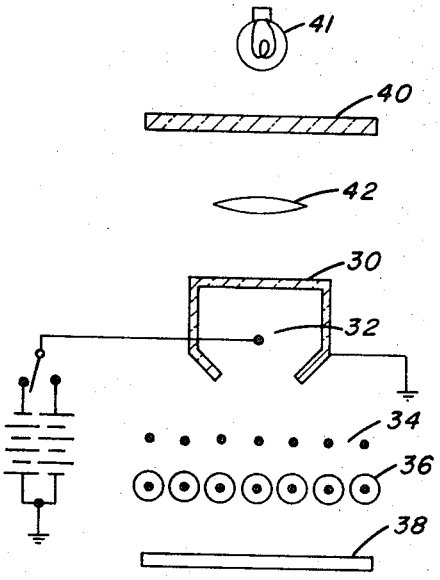
Figure 3:
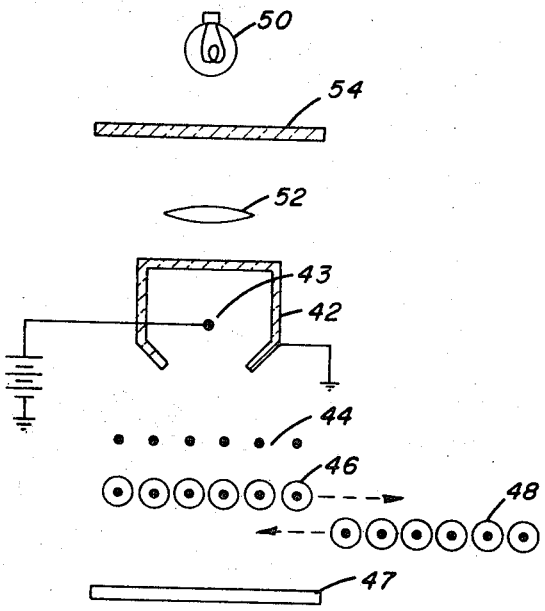

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 13, 1970

879 O.G. 367

T879,010
EXPOSURE LATITUDE IN ELECTRO-PHOTOGRAPHIC SYSTEMS

Lee Fitzpatrick Frank, % Kodak Park Works, Rochester, N.Y. 14650

Filed Apr. 29, 1970, Ser. No. 32,881
Int. Cl. G03g
U.S. Cl. 96—1
1 Sheet Drawing. 9 Pages Specification

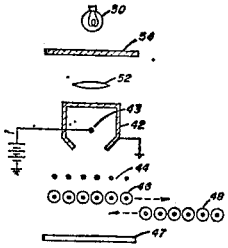

An unsharp image is superposed with a conventional sharp image in an electrophotographic system, thereby improving the exposure latitude of the system. The unsharp image may be produced by modifying the focus of the image during exposure, or by moving a photoconductive grid relative to the image. Both the sharp and unsharp images may be printed onto a receiver sheet simultaneously, or a latent image may be produced first with a subsequent superposition of the unsharp image.

Oct. 13, 1970 L. F. FRANK T879,010

EXPOSURE LATITUDE IN ELECTROPHOTOGRAPHIC SYSTEMS

Filed April 29, 1970

LEE F. FRANK
INVENTOR.

BY J. Wm Berkstresser

ATTORNEY